US010768616B2

(12) United States Patent
Kuwabara et al.

(10) Patent No.: US 10,768,616 B2
(45) Date of Patent: Sep. 8, 2020

(54) PARKING CONTROL METHOD AND PARKING CONTROL DEVICE

(71) Applicant: Nissan Motor Co., Ltd., Yokohama-shi, Kanagawa (JP)

(72) Inventors: Junichi Kuwabara, Kanagawa (JP); Yasuhiro Suzuki, Kanagawa (JP); Yasuhisa Hayakawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/624,162

(22) PCT Filed: Jun. 23, 2017

(86) PCT No.: PCT/JP2017/023242
§ 371 (c)(1),
(2) Date: Dec. 18, 2019

(87) PCT Pub. No.: WO2018/235274
PCT Pub. Date: Dec. 27, 2018

(65) Prior Publication Data
US 2020/0142400 A1    May 7, 2020

(51) Int. Cl.
*G05D 1/00* (2006.01)
*B62D 15/02* (2006.01)
*B60R 11/04* (2006.01)

(52) U.S. Cl.
CPC ......... *G05D 1/0033* (2013.01); *B62D 15/028* (2013.01); *B60R 11/04* (2013.01); *G05D 2201/0213* (2013.01)

(58) Field of Classification Search
USPC ...................... 701/23–28, 400–453
See application file for complete search history.

(56) References Cited

U.S. PATENT DOCUMENTS

| 6,243,029 B1* | 6/2001 | Tomer | G07B 15/02 235/378 |
| 7,104,447 B1* | 9/2006 | Lopez | G06Q 20/206 235/381 |
| 7,870,540 B2* | 1/2011 | Zare | G06F 11/3604 717/109 |
| 8,290,665 B2* | 10/2012 | Placke | B60K 31/0008 180/271 |
| 9,581,997 B1* | 2/2017 | Penilla | B60W 10/20 |

(Continued)

FOREIGN PATENT DOCUMENTS

DE    102014015075 A1    4/2016
JP    2004-260449 A    9/2004
(Continued)

*Primary Examiner* — Jonathan L Sample
(74) *Attorney, Agent, or Firm* — Young Basile Hanlon & MacFarlane, P.C.

(57) ABSTRACT

A parking control method for parking a vehicle on a basis of an operation command includes acquiring an operation command from an operator; detecting an obstacle existing around a vehicle; when detecting the obstacle, notifying the operator of existence of the obstacle and requesting an input of an affirmative determination or a negative determination as to the existence of the obstacle; and when obtaining the affirmative input, parking the vehicle in accordance with a control instruction for moving along a route calculated under a condition that the obstacle exists.

11 Claims, 16 Drawing Sheets

(56) References Cited

U.S. PATENT DOCUMENTS

| | | | | |
|---|---|---|---|---|
| 9,944,282 B1* | 4/2018 | Fields | ............... | G06Q 30/0207 |
| 10,324,463 B1* | 6/2019 | Konrardy | ............ | B60W 50/082 |
| 10,395,332 B1* | 8/2019 | Konrardy | ............. | G05D 1/0246 |
| 2002/0186144 A1* | 12/2002 | Meunier | ................ | G07B 15/00 |
| | | | | 340/4.6 |
| 2003/0122687 A1* | 7/2003 | Trajkovic | ............... | B60Q 9/005 |
| | | | | 340/932.2 |
| 2006/0244577 A1* | 11/2006 | Tanaka | .................... | B60R 25/04 |
| | | | | 340/429 |
| 2011/0118927 A1* | 5/2011 | Cima | ................... | G05D 1/0214 |
| | | | | 701/26 |
| 2014/0200801 A1* | 7/2014 | Tsuruta | ................ | B60W 30/10 |
| | | | | 701/400 |
| 2014/0309804 A1* | 10/2014 | Ricci | .................... | H04W 4/021 |
| | | | | 701/1 |
| 2014/0309864 A1* | 10/2014 | Ricci | .................... | A61B 5/0077 |
| | | | | 701/36 |
| 2015/0019043 A1* | 1/2015 | Creasey | ............... | G05D 1/0038 |
| | | | | 701/2 |
| 2015/0170516 A1* | 6/2015 | Lee | ....................... | G08G 1/205 |
| | | | | 340/988 |
| 2017/0274931 A1* | 9/2017 | Yang | ................. | B62D 15/0295 |
| 2017/0308092 A1 | 10/2017 | Altinger et al. | | |
| 2018/0037262 A1 | 2/2018 | Imai | | |

FOREIGN PATENT DOCUMENTS

| | | |
|---|---|---|
| JP | 2008-074296 A | 4/2008 |
| JP | 2014-136480 A | 7/2014 |
| JP | 2016-074285 A | 5/2016 |
| JP | 2016-185745 A | 10/2016 |
| JP | 2017-007399 A | 1/2017 |

* cited by examiner

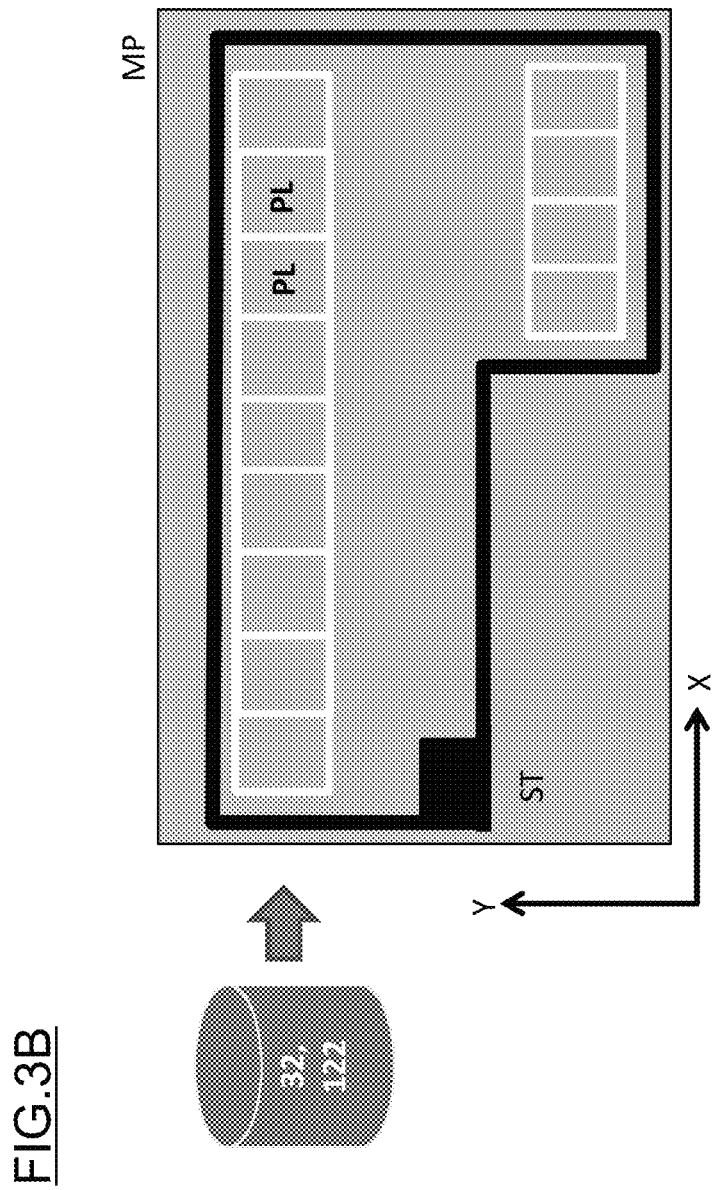

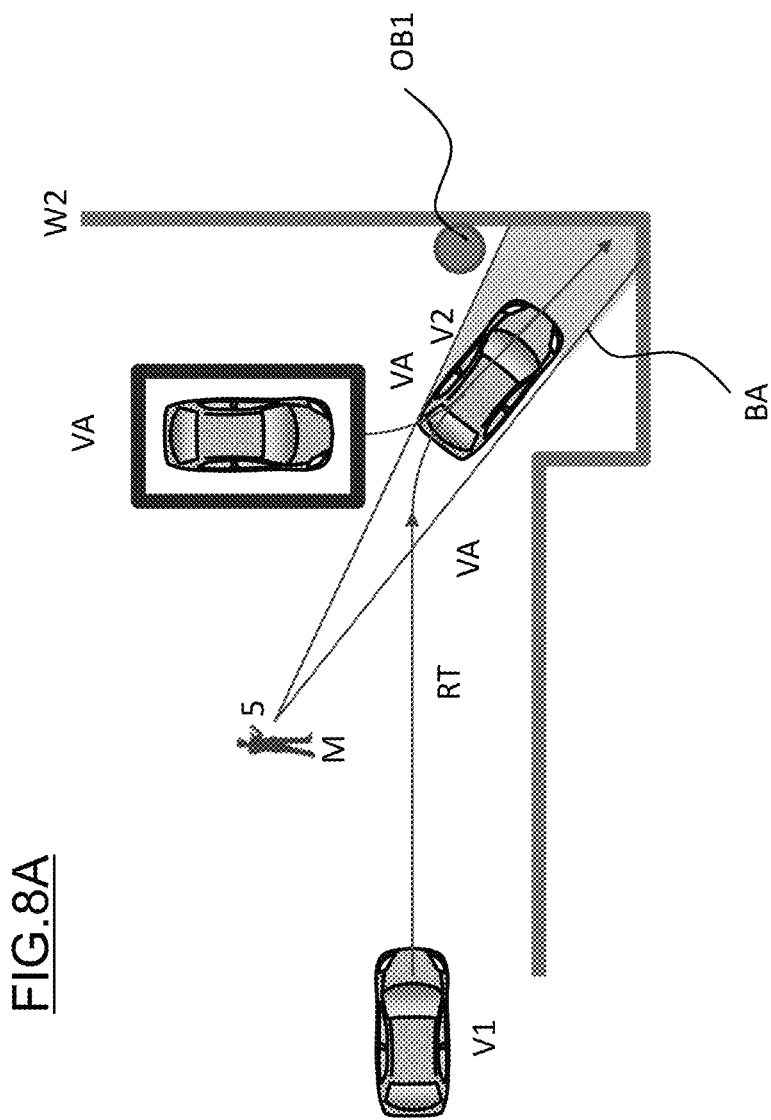

PARKING CONTROL METHOD AND PARKING CONTROL DEVICE

TECHNICAL FIELD

The present invention relates to a parking control method and a parking control apparatus.

BACKGROUND

A parking control technique for controlling a vehicle to make a stop when detecting an obstacle is known (Patent Document 1: JP2008-74296A).

SUMMARY

In the above prior art, when detecting an obstacle, the vehicle is controlled to make a stop even in a case of erroneous detection.

A problem to be solved by the present invention is to allow the vehicle to continue to move even when detecting an obstacle, provided that the detection is erroneous.

The present invention solves the above problem through, when detecting an obstacle, notifying an operator of existence of the obstacle and requesting an input of an affirmative determination or a negative determination as to the existence of the obstacle and, when obtaining the affirmative input, parking a vehicle along a parking route calculated under a condition that the obstacle exists.

According to the present invention, whether or not the detection result of an obstacle is erroneous is checked and, when the detection result of an obstacle is erroneous, the parking process can be executed.

BRIEF DESCRIPTION OF THE DRAWINGS

FIG. 3B is a diagram for describing a second detection scheme for an obstacle;

FIG. 8A is a diagram for describing a state in which an obstacle exists within a visual recognition area;

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. The parking control apparatus may also be applied to a portable operation terminal (equipment such as a smartphone or a PDA: Personal Digital Assistant) capable of exchanging information with an onboard apparatus. The parking control method according to the present invention can be used in the parking control apparatus, which will be described below.

Figure 1:
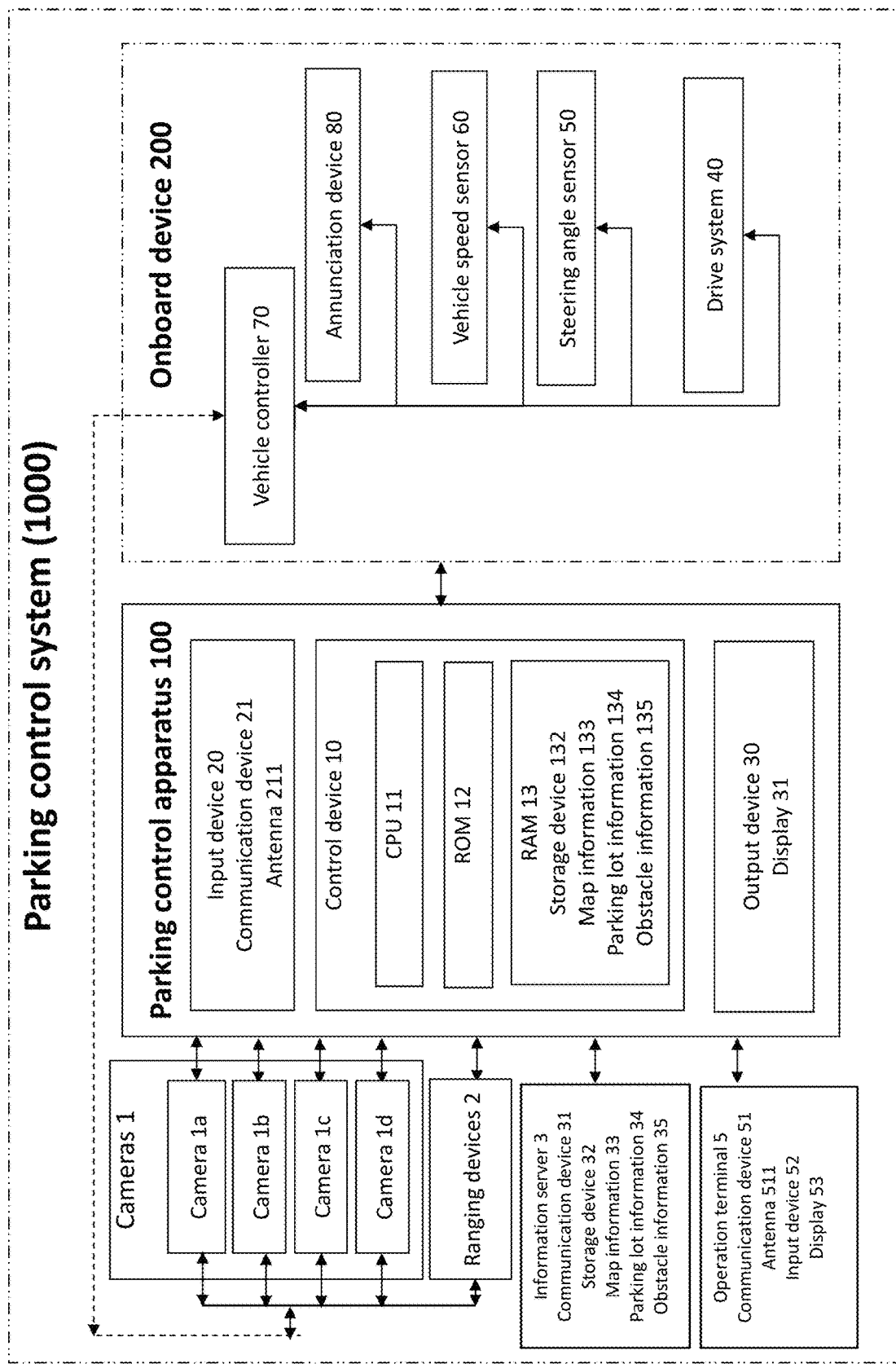
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, ranging devices 2, an information server 3, an operation terminal 5, the parking control apparatus 100, a vehicle controller 70, a drive system 40, a steering angle sensor 50, and a vehicle speed sensor 60. The parking control apparatus 100 according to one or more embodiments of the present invention operates to control an operation of moving (parking) the vehicle into a parking space on the basis of an operation command that is input from the operation terminal 5. In the present description, the vehicle as a target of the parking control will be referred to as a "vehicle V."

The operation terminal 5 is a portable computer that can be brought out to outside of the vehicle and has an input function and a communication function. The operation terminal 5 receives an input of an operator's operation command for controlling the driving (operation) of the vehicle for parking. The driving includes operations for parking (operations for entering a parking space and exiting the parking space). The operator inputs instructions via the operation terminal 5. The instructions include an operation command for execution of parking. The operation command includes execution/stop of parking control, selection/change of a target parking space, selection/change of a parking route, and other information necessary for parking. The operator can also make the parking control apparatus 100 recognize the instructions including the operation command without using the operation terminal 5, such as by a gesture of the operator.

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100.

The operation terminal 5 communicates with the parking control apparatus 100 using signals including a unique identification code.

The operation terminal 5 includes a display 53. The display 53 presents an input interface and various information items. When the display 53 is a touch panel-type display, it has a function of receiving the operation command. The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The information server 3 is an information provision device provided on a network capable of communication. The information server includes a communication device 31 and a storage device 32. The storage device 32 includes readable map information 33, parking lot information 34, and obstacle information 35. The parking control apparatus 100 and the operation terminal 5 can access the storage device 32 of the information server 3 to acquire each information item. The parking control apparatus 100 and the operation terminal 5 may acquire information, such as the position of a parking space and whether or not a vehicle is parked in the parking space, from the information server 3.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. The output device 30 notifies the driver of parking control information. The display 31 according to one or more embodiments of the present invention is a touch panel-type display having an input function and an output function. When the display 31 has an input function, it serves as the input device 20. Even when the vehicle is controlled on the basis of the operation command which is input from the operation terminal 5, an occupant (driver or passenger) can input an operation command, such as a command for emergency stop, via the input device 20. The output device 30 may include a speaker that presents information regarding the parking control.

The control device 10 of the parking control apparatus 100 according to one or more embodiments of the present invention is a specific computer including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program for, when detecting an obstacle, requesting a first input for affirming the existence (or admitting/acknowledging/accepting/recognizing/noting/confirming the existence) of the obstacle or a second input for denying the existence (or disavowing/ negating the existence) of the obstacle to an operator M and, when obtaining the first input, calculating a first parking route under a condition that the obstacle exists and executing the parking control for the vehicle in accordance with the control instruction for moving along the first parking route. This program is executed by the control device 10 of the parking control apparatus 100 according to one or more embodiments of the present invention or by the operation terminal 5.

The parking control apparatus 100 according to one or more embodiments of the present invention is a remote control-type apparatus that receives the operation command from external and controls the movement of the vehicle to park the vehicle into a given parking space. During this operation, the occupant may be located outside the vehicle interior or may also be located inside the vehicle interior.

The parking control apparatus 100 according to one or more embodiments of the present invention may be of an autonomous (automated) control type in which the steering operation and the accelerator/brake operation are performed in an autonomous manner. The parking control apparatus 100 may also be of a semiautonomous (semiautomated) type in which the steering operation is performed in an autonomous manner while the driver performs the accelerator/brake operation.

In the parking control program according to one or more embodiments of the present invention, the user may arbitrarily select a target parking space, or the parking control apparatus 100 or the parking facility side may automatically set a target parking space.

The control device 10 of the parking control apparatus 100 according to one or more embodiments of the present invention has functions of executing a setting process for an observation position, a calculation process for a first area and/or a second area, a calculation process for the parking route, a calculation process for the control instruction, and a parking control process. The control device 10 further has functions of executing an obstacle detection process and calculating the parking route with consideration for the position of the obstacle. Each of the above processes is executed by cooperation of software for implementing the process and the above-described hardware.

Some processes of calculating the position of the operator M will be described with reference to FIGS. 2A to 2D. The position of the operator M refers to a position at which the operator M observes the movement of the vehicle V and performs the operations for the parking process. The position of the operator M may be detected on the basis of the sensor signals from sensors provided in the vehicle V or may also be obtained through detecting the position of the operation terminal 5 carried by the operator M and calculating the position of the operator M on the basis of the position the operation terminal 5. The operation terminal 5 may be provided at a predetermined position or may also be carried by the operator M. When the operation terminal 5 is provided at a predetermined position, the operator M moves to the position at which the operation terminal 5 is provided, and uses the operation terminal 5 there. In these cases, the position of the operation terminal 5 can be employed as the position of the operator M.

Figure 2A:
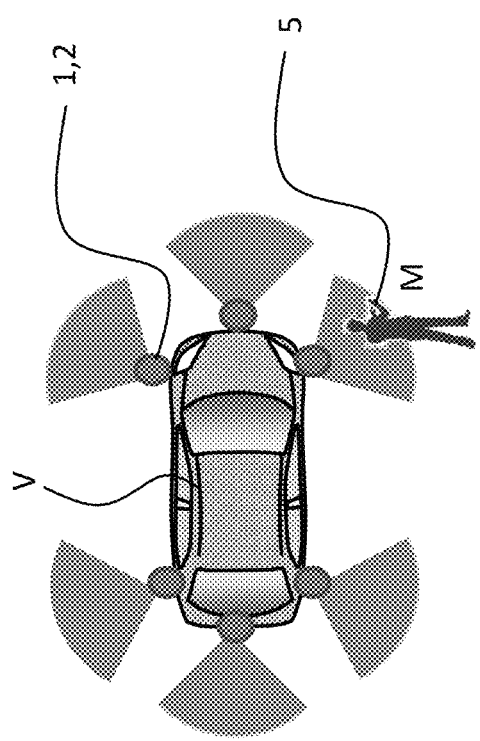
FIG. 2A is a diagram for describing a first detection scheme for the position of an operator.

As illustrated in FIG. 2A, the position of the operator M is detected on the basis of the detection results from the multiple ranging devices 2 provided in the vehicle and/or the images captured by the cameras 1. The position of the operator M can be detected on the basis of the images captured by the cameras 1a to 1d. The ranging devices 2 for use may each be a radar device, such as a millimeter-wave radar device, a laser radar device, or an ultrasonic radar device, or a sonar device. The multiple ranging devices 2 and their detection results can be identified, and the position of the operator M can therefore be detected on the basis of the detection results. The ranging devices 2 may be provided at the same positions as the cameras 1*a* to 1*d* or may also be provided at different positions. The control device 10 can also detect a gesture of the operator M on the basis of the images captured by the cameras 1*a* to 1*d* and identify the operation command associated with the gesture.

Figure 2B:
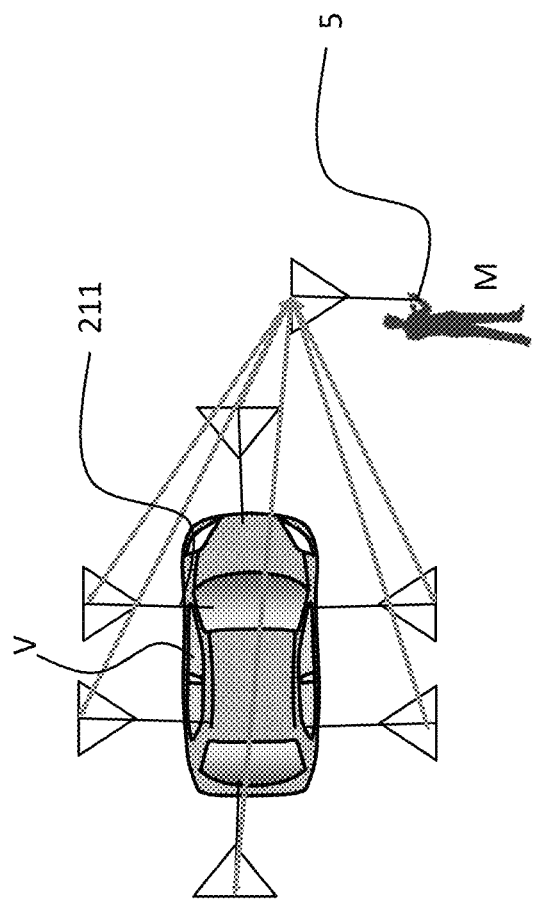
FIG. 2B is a diagram for describing a second detection scheme for the position of an operator.

As illustrated in FIG. 2B, the position of the operation terminal 5 or of the operator M carrying the operation terminal 5 may also be detected on the basis of the communication radio waves between multiple antennas 211 provided at different positions of the vehicle V and the operation terminal 5. When the multiple antennas 211 communicate with one operation terminal 5, the intensity of the received radio wave of each antenna 211 is different. The position of the operation terminal 5 can be calculated on the basis of the intensity difference between the received radio waves of the antennas 211. The two-dimensional position and/or three-dimensional position of the operation terminal 5 or of the operator M can be calculated from the intensity difference between the received radio waves of the antennas 211.

Figure 2C:
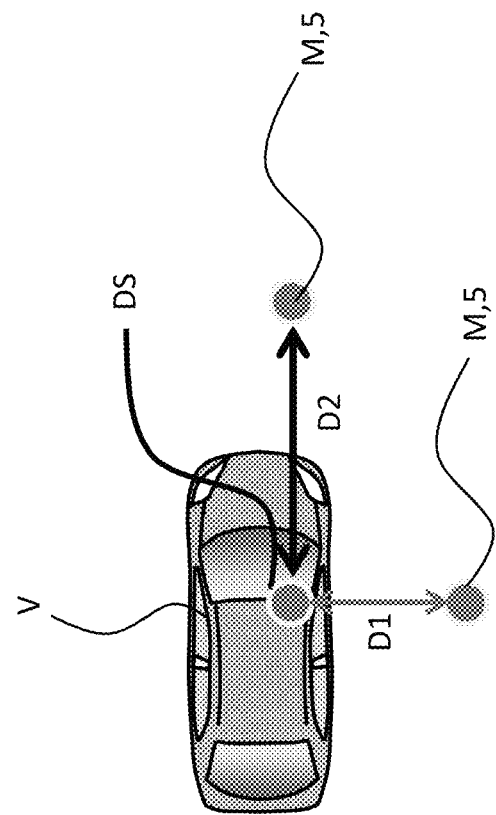
FIG. 2C is a diagram for describing a third detection scheme for the position of an operator.

As illustrated in FIG. 2C, a predetermined position (direction/distance: D1, D2) with respect to the driver seat DS of the vehicle V may be preliminarily designated as the operating position of the operator M or as the position at which the operation terminal 5 is disposed. For example, when the operator M temporarily stops the vehicle V at a designated position and gets off the vehicle V to operate the operation terminal 5 provided at the predetermined position, it is possible to detect the initial position of the operator M with respect to the vehicle V or the initial position of the terminal 5, which is carried by the operator M, with respect to the vehicle V.

Figure 2D:
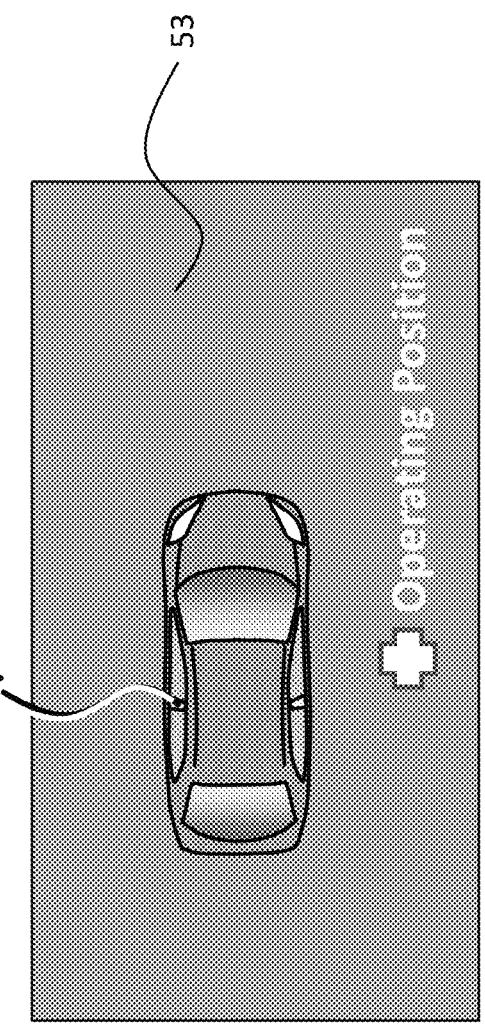
FIG. 2D is a diagram for describing a fourth detection scheme for the position of an operator.

As illustrated in FIG. 2D in a similar manner, image information representing the operating position (a position at which the operator M is located: operation position) with respect to the vehicle V is displayed on the display 53 of the operation terminal 5. This display control may be executed by an application stored on the operation terminal 5 side or may also be executed on the basis of a command from the control device 10.

In one or more embodiments of the present invention, the observation position of the operator M is calculated to calculate a first area which the operator M can visually recognize or a second area (blind area) which the operator M cannot visually recognize. When calculating the first area (or the second area), the detected two-dimensional position of the operator M may be calculated as the observation position. In this calculation, the eye position of the operator M (height information) may be taken into account. A position corresponding to the eye position of the operator M is calculated as the observation position on the basis of the two-dimensional position of the operation terminal 5 obtained by the above scheme. The observation position may be calculated using the standing height of the operator M, which is preliminarily set, or the average standing height of the adult. When the detection signal representing the positional information of the operation terminal 5 includes height information, the position of the operation terminal 5 may be employed as the observation position.

The detection process for an obstacle will be described with reference to FIGS. 3A and 3B. Obstacles include structures, such as walls and pillars of a parking lot, installations around the vehicle, pedestrians, other vehicles, parked vehicles, etc.

Figure 3A:
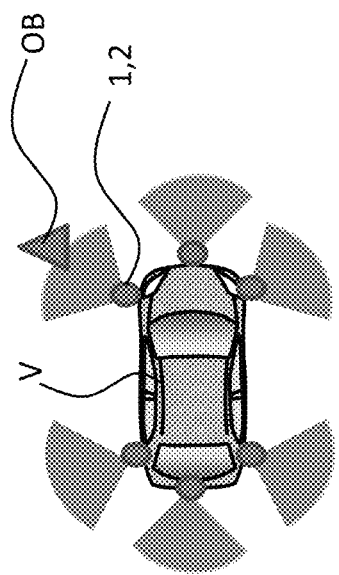
FIG. 3A is a diagram for describing a first detection scheme for an obstacle.

As illustrated in FIG. 3A, an obstacle is detected on the basis of the detection results from the multiple ranging devices 2 provided in the vehicle V and the images captured by the cameras 1. The ranging devices 2 detect the existence or absence of an object, the position of the object, the size of the object, and the distance to the object on the basis of the received signals from the radar devices. Additionally or alternatively, the existence or absence of an object, the position of the object, the size of the object, and the distance to the object may be detected on the basis of the images captured by the cameras 1*a* to 1*d*. The detection of an obstacle may be performed using a motion stereo technique with the cameras 1*a* to 1*d*. The detection results are used to determine whether or not a parking space is empty (whether or not a vehicle is parked in the parking space).

As illustrated in FIG. 3B, obstacles including structures such as walls and pillars of a parking lot can be detected on the basis of the parking lot information 34 acquired from the storage device 32 of the information server 3. The parking lot information includes the location and identification number of each parking lot and positional information of passages, pillars, walls, storage spaces, etc. in the parking facility. The information server 3 may be managed by staffs of the parking lot.

The calculation process for a visual recognition area (first area) that is visually recognizable by the operator M and/or a blind area (second area) that is visually unrecognizable by the operator M. On the basis of the positional relationship between the position of an obstacle and the position of the operator M, the control device 10 calculates the first area which the operator M can observe from the calculated observation position of the operator M. The control device 10 calculates, as the first area, an area in which the visual field is not shaded by an obstacle when the operator M observes from the observation position. The control device 10 calculates, as the second area, an area in which the visual field is shaded by an obstacle when the operator M observes from the observation position. The second area which is unobservable or visually unrecognizable from the operator M can be calculated from the positional relationship with the obstacle. A blind area caused not only by an obstacle but also by the vehicle V to be operated may be set as the second area which is visually unrecognizable. The control device 10 calculates, as the second area, an area in which when the operator M observes from the observation position, the visual field is shaded by the vehicle to be operated. The second area which is unobservable from the operator M can be calculated from the positional relationship with the vehicle to be parked. Schemes known at the time of filing this application can be appropriately used as the scheme of calculating a visually observable area and the scheme of calculating a blind area. As will be understood, obstacles include other vehicles that are not the targets of operation. From the viewpoint of reducing the calculation load, the control device 10 may calculate the second area first and set an area other than the second area as the first area. Additionally or alternatively, the second area may be set as a relatively wide area in consideration of the detection accuracy of an obstacle and the detection accuracy of the position of the operator M will then be described.

Figure 4A:
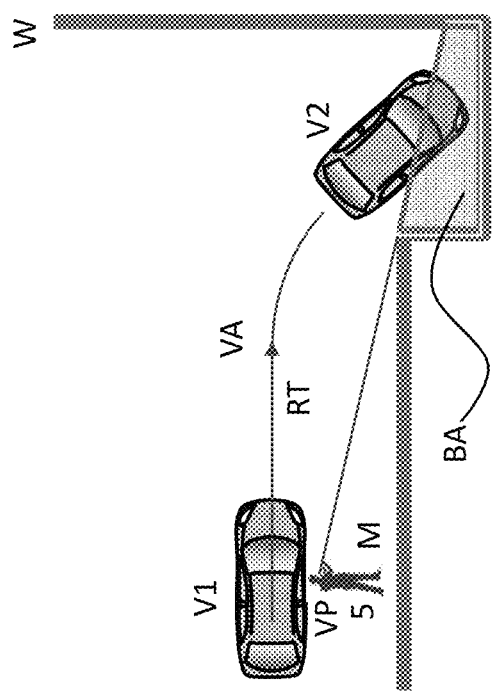
FIG. 4A is a diagram for describing a first calculation scheme for a first area that is visually recognizable by an operator and a second area (blind area)

FIG. 4A illustrates an example of the case in which a blind area occurs due to the structure of the parking lot. In the example illustrated in FIG. 4A, the vehicle V1 moves along a parking route RT and the operator M standing on the side of the vehicle V1 operates the operation terminal 5. The control device 10 calculates, as a first area VA, an area that can be estimated to be visually recognizable without being shaded by another object when the operator M observes from an observation position VP. In the example of FIG. 4A, the visual field of the operator M is shaded by a wall W of the parking lot. The control device 10 calculates, as a second area BA, an area that is estimated to be hidden behind the wall W and visually unrecognizable when the operator M observes from the observation position VP.

Figure 4B:
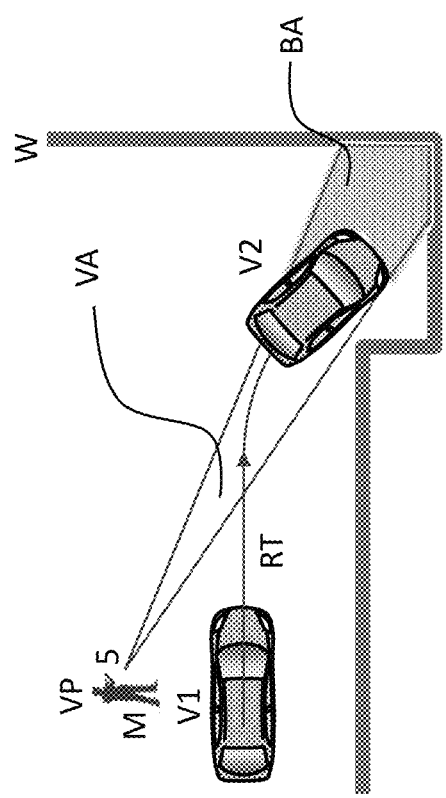
FIG. 4B is a diagram for describing a second calculation scheme for a first area that is visually recognizable by an operator and a second area (blind area)

FIG. 4B illustrates an example of the case in which a blind area occurs due to the vehicle itself to be controlled. The control device 10 calculates, as the first area VA, an area that can be estimated to be visually recognizable without being shaded by another object when the operator M observes from the observation position VP. In the example of FIG. 4B, the visual field of the operator M is shaded by the vehicle V2 which is located at a position of turn for parking on the estimated parking route. The control device 10 calculates, as the second area BA, an area that is estimated to be hidden behind the vehicle V2 and visually unrecognizable when the operator M observes from the observation position VP. The control device 10 preliminarily stores the vehicle information, such as the height and size of the vehicle, which is used in the calculation of the second area BA. The vehicle information may be information unique to the vehicle or may also be information defined in accordance with the vehicle type and the like.

Figure 4C:
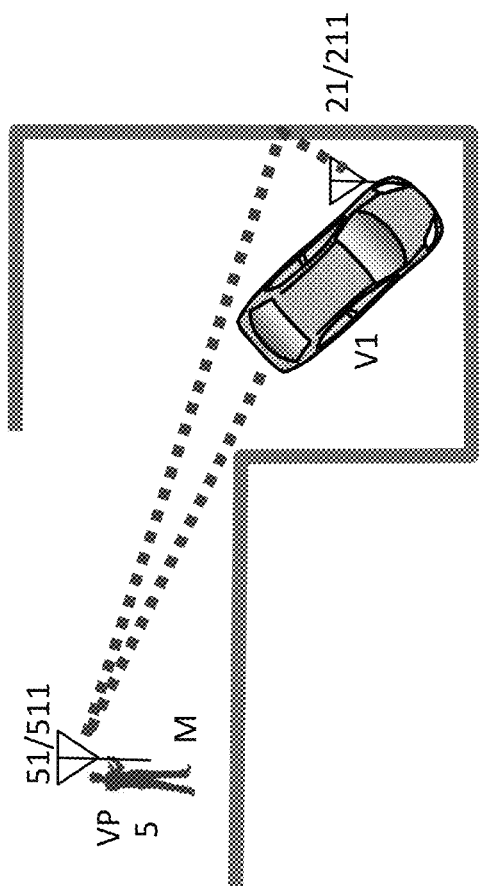
FIG. 4C is a diagram for describing a third calculation scheme for a first area that is visually recognizable by an operator and a second area (blind area)

As illustrated in FIG. 4C, on the basis of the intensity of the received radio waves, generation of reflected waves, occurrence of interference and multipath, etc. between a communication device 51 and an antenna 511 of the operation terminal 5 and the communication device 21 and antennas 211 of the communication device 21 of the parking control apparatus 100, the existence of a recessed part may be determined from the position of the wall of the parking lot or the shape of the space, and the presence of a blind area may be determined on the basis of the determination result.

The control procedure of parking control will be described below with reference to the flowchart illustrated in FIG. 5.

Figure 5:
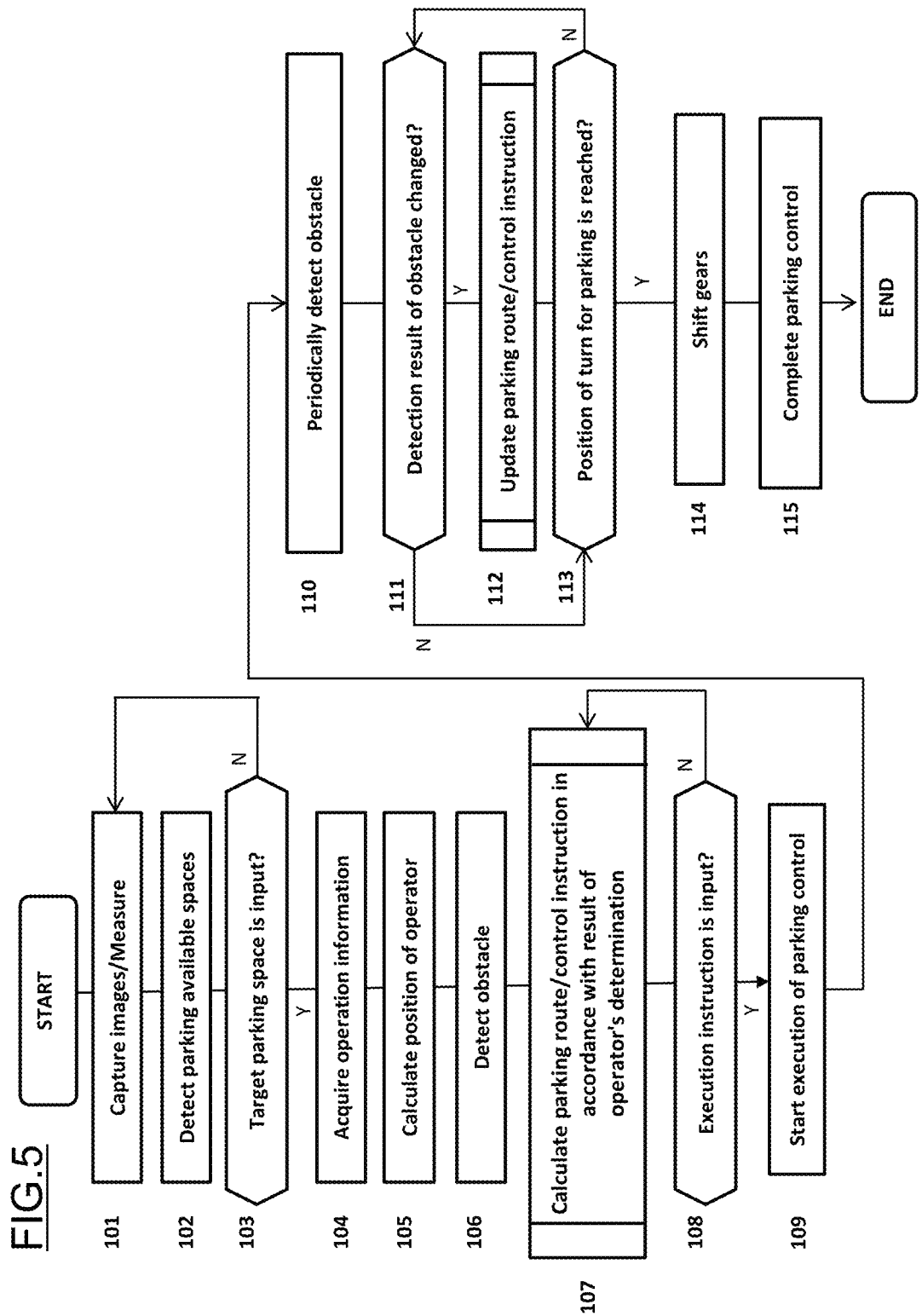
FIG. 5 is a flowchart illustrating an example of a control procedure executed by the parking control system according to one or more embodiments of the present invention.

FIG. 5 is a flowchart illustrating the control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V in an autonomous manner to a parking space on the basis of the operation command acquired from outside of the vehicle.

In step 101, the control device 10 of the parking control apparatus 100 according to one or more embodiments of the present invention acquires ranging signals from the ranging devices 2 which are attached to multiple sites of the vehicle V. The control device 10 acquires images captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 102, the control device 10 detects parking spaces into which parking is possible. The control device 10 detects frames (areas) of parking spaces on the basis of the images captured by the cameras 1a to 1d. The control device 10 detects empty parking spaces using the detection data from the ranging devices 2 and the detection data extracted from the captured images. The control device 10 detects parking available spaces from among the parking spaces. The parking available spaces are parking spaces which are empty (i.e., other vehicles are not parked) and to which routes for completing the parking can be calculated. Information on the available parking spaces may be acquired from the information server 3.

In one or more embodiments of the present invention, the condition that a parking route can be calculated means that a trajectory of the parking route from the current position to a target parking space can be rendered on the road surface coordinates without interfering with obstacles (including parked vehicles).

In step 103, the control device 10 transmits the parking available spaces to the operation terminal 5, controls the display 53 to display the parking available spaces, and requests the operator to input selection information of the target parking space for parking the vehicle. The target parking space may be automatically selected by the control device 10 or the parking facility side. When an operation command of specifying a parking space is input to the operation terminal 5, the parking space is set as the target parking space.

In one or more embodiments of the present invention, in step 104, the control device 10 acquires the operation information from the operator M who has got off the vehicle. The control device 10 confirms that the acquisition of the operation information necessary for the parking process is completed. Subsequently, the process of moving the vehicle to the target parking space by remote control is started. The target parking space may be selected by the operator M after the operator M gets off the vehicle.

In step 105, the control device 10 calculates the position of the operator M (observation position) using the previously described scheme. In step 105, the control device 10 calculates the first area observable by the operator M from the observation position VP. The first area is calculated on the basis of the position of an obstacle. The control device 10 calculates the second area BA unobservable by the operator M from the observation position VP. The second area is calculated on the basis of the position of an obstacle. The position of an obstacle refers to the position of an area in which the obstacle exists. That is, the position of an obstacle is represented by the coordinate values of an occupied area by the obstacle in the three-dimensional coordinates.

Step 105 is followed by step 106, in which the control device 10 uses the previously described scheme to detect the existence of an obstacle and the position at which the obstacle exists.

In step 107, the control device 10 confirms the determination inputted/made by the operator M regarding the detection result of an obstacle and calculates a parking route and a control instruction for moving along the parking route, in accordance with the determination result.

Figure 6:
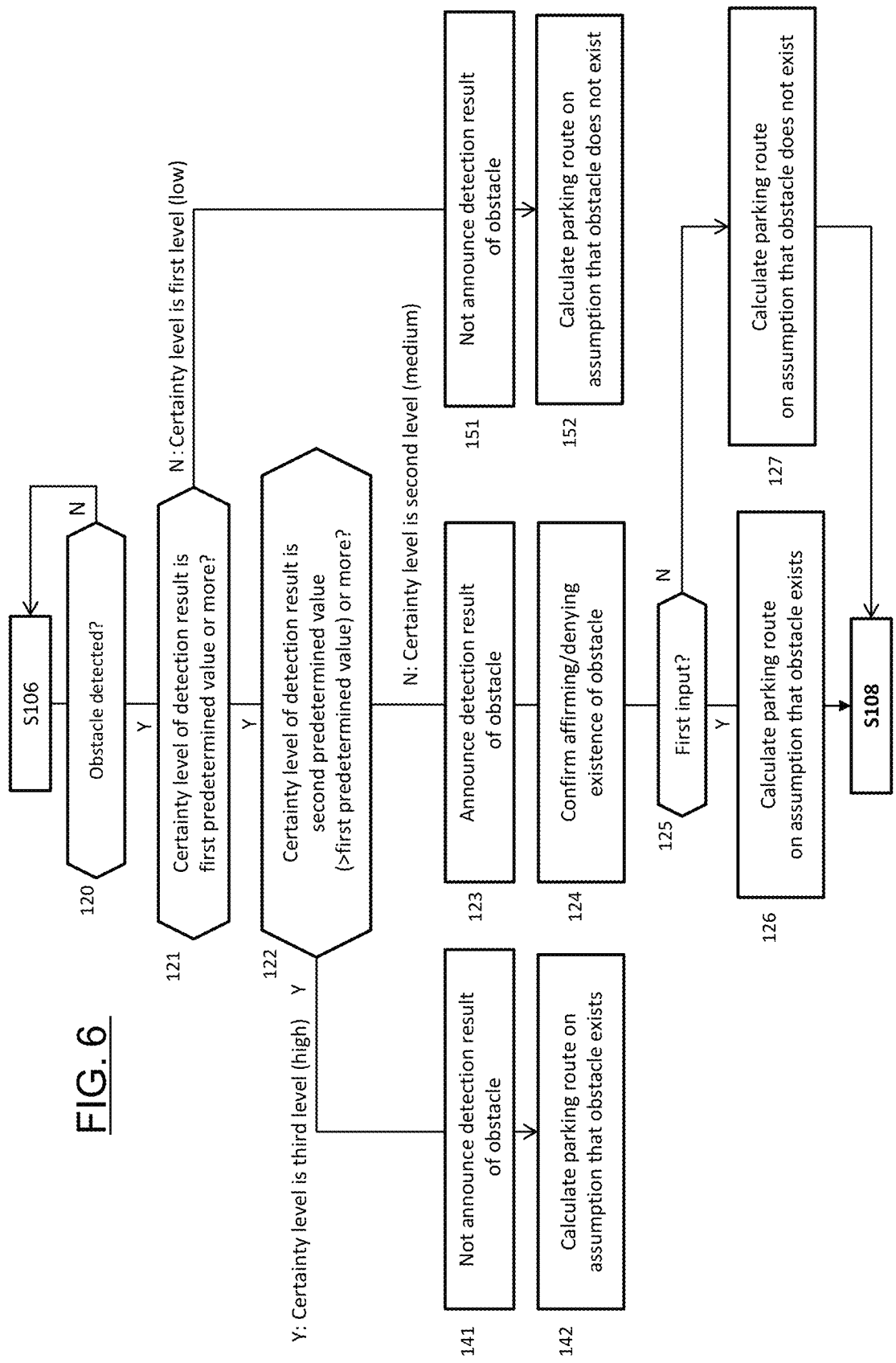
FIG. 6 is a first flowchart illustrating an example of a calculation scheme for a parking route in accordance with the determination result of a detection result.

FIG. 6 illustrates a subroutine of step 107. This process is executed when there is an output indicating that an obstacle is detected (step 120). The control device 10 of the parking control apparatus 100 may execute each process or the operation terminal 5 may be operated to execute each process. The arithmetic processing unit of the operation terminal 5 may execute each process or the control device 10 may be operated to execute each process.

In step 121, a certainty level of the detection result is evaluated. The ranging devices 2 output a certainty level or likelihood as the certainty of the detection result together with the detection result. The ranging devices 2 determine that the higher the intensity of the acquired signals, or the larger the number of signals, or the smaller the variation of the signal distribution, the higher the certainty level of the detection result. The ranging devices 2 calculate the certainty level or likelihood on the basis of the intensity, number, and distribution of the signals employed when deriving the detection result that an obstacle exists.

When detecting an obstacle on the basis of the images captured by the cameras 1, the image processing function for executing the obstacle detection serves to output the certainty level or likelihood together with the detection result with consideration for the position and size of the obstacle, the matching rate with a template, and the influence of disturbance in the imaging environment. The image processing function serves to calculate the certainty level on the basis of the reliability level of an edge extraction process in the obstacle detection process. For example, the certainty level of an obstacle being detected from the captured images is calculated using factors such as a large contrast width of pixels in the edge extraction, high edge continuity, a long edge length, and a low edge position variation. Additionally or alternatively, the certainty level of an obstacle being detected from the captured images is calculated on the basis of the matching rate of pattern matching between features such as a size, a shape, and movement of the extracted object and features of objects existing on the road.

In step 121, the control device 10 evaluates the certainty level of the detection result. When the certainty level is less than a first predetermined value, the process proceeds to step 151. The control device 10 determines that the certainty level of the obstacle detection result is low (first level) and does not make announcement to the operator M (step 151). Then, the parking route is calculated on the assumption that no obstacle exists (step 152).

In step 121, when the certainty level is less than the first predetermined value, the process proceeds to step 122. In this case, a determination can be made that the certainty level of the detection result is a medium or high level. In step 122, the control device 10 determines whether or not the certainty level of the detection result is a second predetermined value or more. When the certainty level is the second predetermined value or more, a determination is made that the certainty level is high (third level), and the process proceeds to step 141. In step 141, the control device 10 does not present the existence of an obstacle to the operator M. In the case of the detection result with a high certainty level, it is highly possible that the object exists. This is also apparent to the operator M, so the existence of an obstacle is not presented to the operator M as the above because the cost of confirming the existence of an obstacle is likely to be wasted. Of course, from the viewpoint of carefulness, the detection result may be presented to the operator M for confirmation of the existence of an obstacle. In step 141, the control device 10 puts importance on the detection result with a high certainty level and calculates the parking route on the assumption that an obstacle exists.

The parking control method according to one or more embodiments of the present invention is characterized in the response when the certainty level is a medium level (second level) and the reliability level of the detection result is uncertain. When a certainty level P of the detection result is the first predetermined value or more and less than the second predetermined value (second predetermined value>P>first predetermined value) as a result of the determination in step 122, the process executed by the control device 10 proceeds to step 123. In step 123, the control device 10 announces the detection result of an obstacle to the operator M. For the detection result with a medium certainty level, the control device 10 confirms the determination inputted/made by the operator M because it is unclear whether the detection result is correct or incorrect. When the certainty level is within a predetermined threshold range, it is difficult to evaluate the reliability level of the detection result. In one or more embodiments of the present invention, when the certainty level is within the predetermined threshold range, the operator M is requested to make the first input or the second input, and the detection result is evaluated again. This allows the parking route and the control instruction to be calculated on the basis of the detection result with a high certainty level.

The detection result of an obstacle is transmitted to the operation terminal 5. The control device 10 may notify the external operator of the existence of an obstacle by turning on an annunciation device 80, such as headlights, winker lamps, hazard lamps, tail lamps, or indoor lamps provided in the vehicle V. Examples of the annunciation device 80 also include a wiper, a horn, a speaker, and a display device. The wiper may be operated to notify the external operator of the existence of an obstacle. Additionally or alternatively, the horn and/or the speaker may be operated to output sound or voice information thereby to notify the external operator of the existence of an obstacle. Additionally or alternatively, the display device may be operated to present text information and/or image information to external thereby to notify the external operator of the existence of an obstacle. By using the annunciation device 80 to notify the operator M of the existence of an obstacle, confirmation inputted/made by the operator M can be readily acquired.

In step 124, the control device 10 requests the operator M to determine the detection result of the existence of an obstacle. The control device 10 notifies the operator M of the existence of an obstacle and requests the first input for affirming (or admitting/acknowledging/accepting/recognizing/noting/confirming the existence) the existence of the obstacle or the second input for denying (or disavowing/negating) the existence of the obstacle. The control device 10 outputs, to the operation terminal 5, an instruction for displaying the existence of an obstacle on the display 53 of the operation terminal 5. The operation terminal 5 may display the existence of an obstacle on the display 53. The operator M can be reliably notified of the existence of an obstacle. In addition, the operation terminal 5 receives the first input or the second input via the input device 52. The input device 52 may be a touch panel-type input device 52 or a voice input-type microphone. In this example, the touch panel-type display 53 serves also as the input device 52. The operation terminal 5 can be used to present an obstacle, make the operator M determine the existence of the obstacle, and obtain the determination result. The operator M can easily indicate the determination result.

Figure 7:
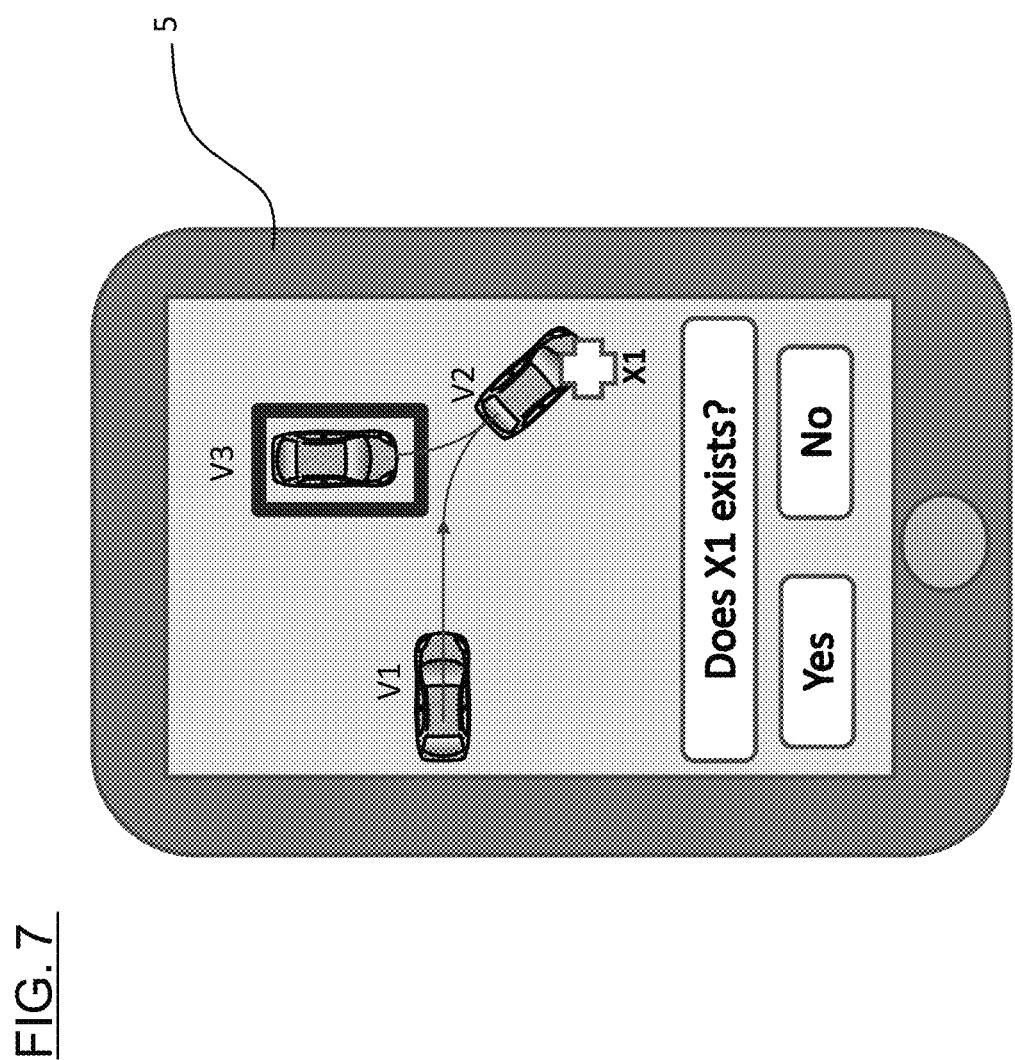
FIG. 7 is a display example on a terminal device when requesting the determination of a detection result.

FIG. 7 illustrates an example of the information displayed on the display 53 when the first input or the second input is requested to the operator M. This confirmation request information is presented on the display 53 of the operation terminal 5. As illustrated in FIG. 7, the control device 10 presents the operator M with varying positions V1, V2, and V3 over time of the vehicle V to be parked, the parking route, and an obstacle X1 that exists at the position V2 of turn for parking. The confirmation request information displayed on the operation terminal 5 asks the operator M whether or not the obstacle X1 exists. The operation terminal 5 may display a question of "X1 exists?" in text or may also output this question by voice. The operator M touches the "Yes" button when X1 can be visually recognized, or touches the "No" button when X1 cannot be visually recognized. Additionally or alternatively, the determination that X1 does not exist can be input to the operation terminal 5 by the second input which is made such that the operator M wipes the plus mark indicating the position of the obstacle so as to remove it. Additionally or alternatively, the determination that X1 exists can be input to the operation terminal 5 by the first input which is made such that the operator M double-touches the plus mark indicating the position of the obstacle.

In step 125, when the first input is made, that is, when the existence of the obstacle is affirmed, the process proceeds to step 126, in which the control device 10 calculates the first parking route on the assumption that the obstacle exists, and calculates a control instruction for moving the vehicle V along the first parking route. Thus, the vehicle V can be moved along the parking route while avoiding the obstacle on the basis of the result of confirmation inputted/made by the operator M, and the parking control can therefore be executed regardless of the accuracy of the detection result of an obstacle.

On the other hand, when the second input is made, that is, when the existence of the obstacle is denied, the process proceeds to step 127, in which the control device 10 calculates the second parking route on the assumption that no obstacle exists, and calculates a control instruction for moving the vehicle V along the second parking route. The vehicle V can be moved along the parking route on the assumption that no obstacle exists on the basis of the result of confirmation inputted/made by the operator M, and the parking control can therefore be executed regardless of the accuracy of the detection result of an obstacle.

In the above process, the control device 10 and/or the operation terminal 5 may request the first input or the second input to the operator M when the distance between the operator M and an obstacle is less than a predetermined value. This is because when the obstacle exists at a position far from the operator M, it is considered that the reliability level of determination inputted/made by the operator M is low. Thus, the first input or the second input is requested when the distance between the operator M and an obstacle is less than the predetermined value, and it is therefore possible to reduce the execution of the parking control based on an erroneous determination and ensure the accuracy of determination inputted/made by the operator M.

In the above process, the control device 10 and/or the operation terminal 5 may operate the vehicle V to stop when the distance between the operator M and an obstacle is not less than a predetermined value. When the obstacle exists at a location away from the operator M by a predetermined distance or more, it is considered that the reliability level of determination inputted/made by the operator M is low; therefore, the vehicle V is stopped and the parking control is canceled. It is thus possible to reduce the execution of the parking control based on an erroneous determination inputted/made by the operator M and ensure the accuracy of determination inputted/made by the operator M.

In the above process, the control device 10 and/or the operation terminal 5 may request the first input or the second input to the operator M when the position of an obstacle belongs to the visual recognition area VA for the operator M (the position of an obstacle is in the visual recognition area VA for the operator M). The visual recognition area VA for the operator M is calculated using the above-described scheme. That is, when the position of the obstacle belongs to the visual recognition area VA for the operator M, the vehicle V is parked in accordance with the control instruction for moving along the first parking route. FIG. 8A illustrates an example when a detected obstacle OB1 exists within the visual recognition area VA. When the obstacle OB1 exists within the first area VA in which the obstacle OB1 is visually recognizable by the operator M, it is considered that the reliability level of determination inputted/made by the operator M is high. The first input or the second input is requested when the operator M can visually recognize an obstacle, and it is therefore possible to reduce the execution of the parking control based on an erroneous determination and ensure the accuracy of determination inputted/made by the operator M.

Figure 8B:
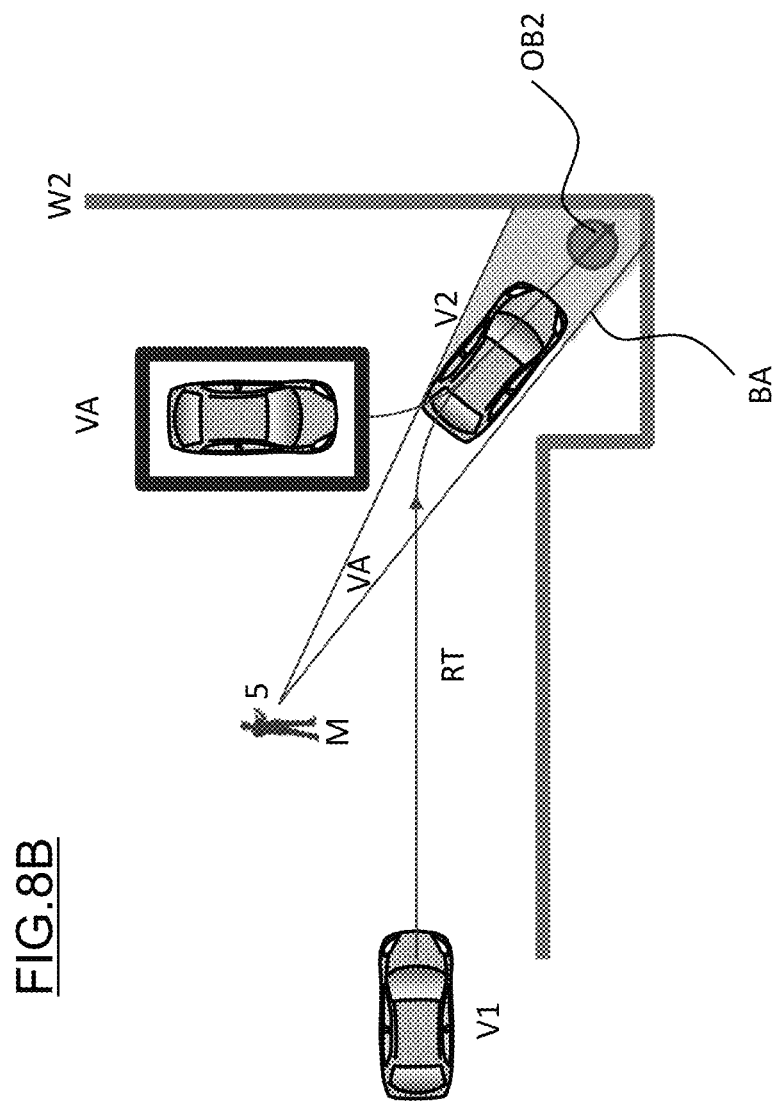
FIG. 8B is a diagram for describing a state in which an obstacle exists within a visually unrecognizable area (blind area)

In the above process, the control device 10 and/or the operation terminal 5 may operate the vehicle V to stop when the position of an obstacle belongs to the blind area BA other than the visual recognition area VA for the operator M. FIG. 8B illustrates an example when a detected obstacle OB2 exists within the blind area BA. When an obstacle exists within an area in which the obstacle is visually unrecognizable from the operator M, it is considered that the reliability level of determination inputted/made by the operator M is low; therefore, the vehicle V is stopped and the parking control is canceled. It is thus possible to reduce the execution of the parking control based on an erroneous determination inputted/made by the operator M and ensure the accuracy of determination inputted/made by the operator M.

Referring again to FIG. 5, in step 107, the control device 10 calculates a parking route from the parking standby position of the vehicle to the target parking space. In this step, the control device 10 calculates a control instruction for the vehicle to move along the parking route. The control instruction includes an operation instruction for any one or more of the steering amount, steering speed, steering acceleration, shift position, speed, acceleration, and deceleration of the vehicle. In addition, the control instruction includes the execution timing or execution position for the above operation instruction for the vehicle.

The control device 10 preliminarily stores the spec information of the vehicle necessary for the control instruction. Examples of the control instruction include instructions for the steering amount, steering speed, steering acceleration, shift position, speed (including zero), acceleration, and deceleration of the vehicle, which are associated with the timing or position when the vehicle travels along the parking route, and other operation instructions. The instruction regarding the parking route and the operation instruction associated with the parking route are executed by the vehicle, and the vehicle can thereby be moved (parked) into the target parking space.

The parking control apparatus 100 according to one or more embodiments of the present invention operates to execute the parking control process by remote control for performing the parking through transmitting a target parking space setting command, a parking control process start command, a parking interruption/cancellation command, and other appropriate commands from the external to the vehicle V1 without requiring the operator to get on the vehicle V1. In step 108, the control device 10 controls the display 53 of the operation terminal 5 to present the parking route. In step 108, when the operator confirms the parking route and inputs an execution instruction, the operation terminal 5 transmits the execution instruction, which is input by the operator, to the parking control apparatus 100 of the vehicle V. The parking control apparatus 100 of the vehicle V operates to start the parking control.

In step 110, after starting the parking control, the control device 10 periodically executes the detection process for an obstacle. The existence of an obstacle and its position vary with time. The visually recognizable first area and the visually unrecognizable second area also vary as the position of the vehicle V varies. To respond to the change in the situation, the control device 10 executes the detection process for an obstacle at a predetermined cycle. In step 111, the control device 10 determines whether or not there is a change in the detection result of an obstacle. When there is a change, the parking route (including the position of turn for parking) and the control instruction also change; therefore, in step 112, the parking route and the control instruction are calculated again. When a new parking route is calculated, the parking route is updated. The control device 10 calculates a control instruction for the new parking route. In step 111, when there is no change in the detection result of an obstacle, it is not necessary to calculate a new parking route and a new control instruction, and the process proceeds to step 113. The process of calculating the parking route and the control instruction is basically the same as that in step 107.

Figure 9:
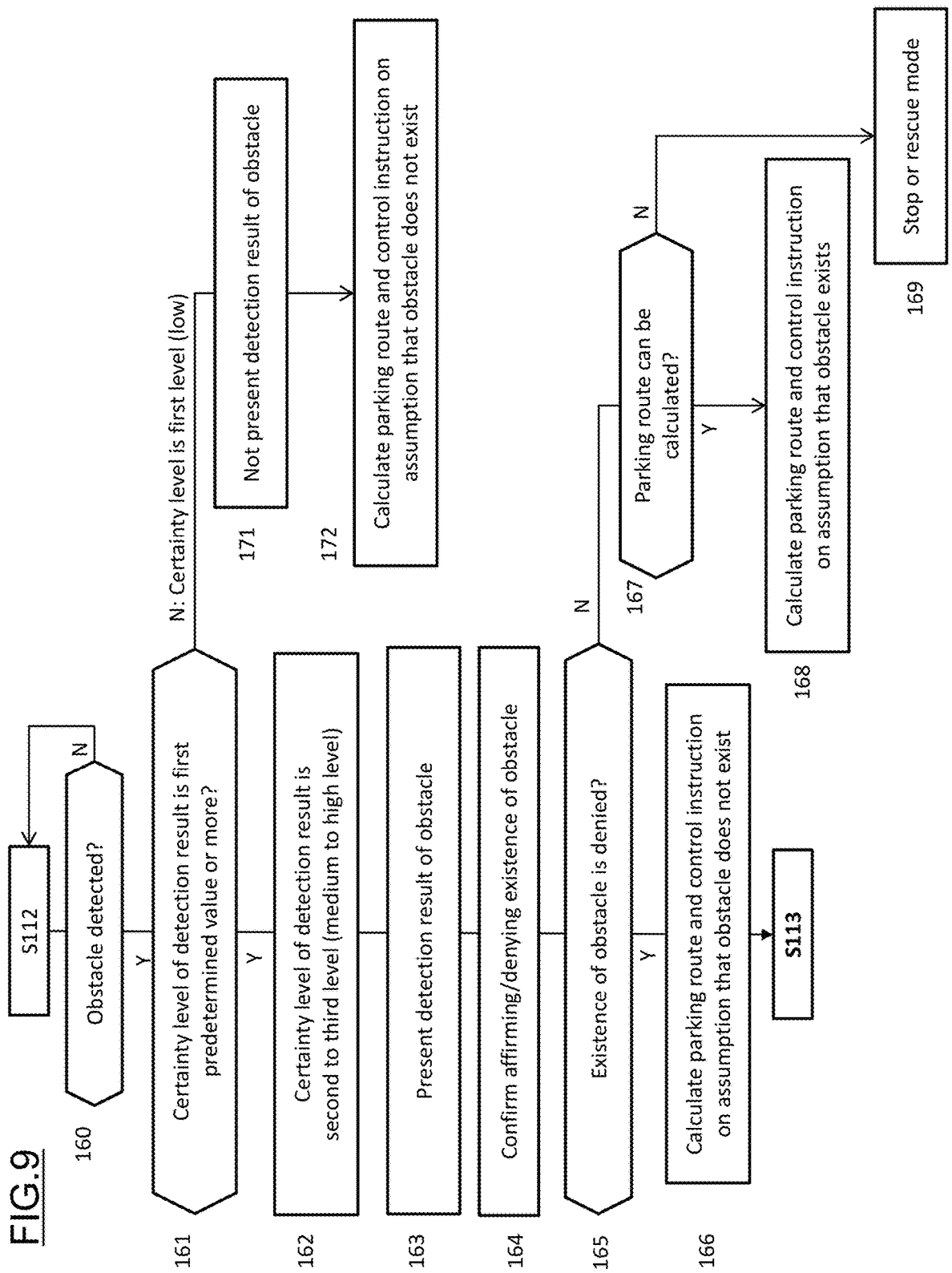
FIG. 9 is a second flowchart illustrating an example of a calculation scheme for a parking route in accordance with the determination result of a detection result.

FIG. 9 illustrates a subroutine of step 112. When the control device 10 detects an obstacle in step 160, the process proceeds to step 161. When a determination is made that the certainty level of the detection result is less (lower) than the first predetermined value, the process proceeds to step 171. The detection result of an obstacle with a low certainty level is not presented to the operator M. In step 172, the control device 10 calculates the parking route and the control instruction on the assumption that no obstacle exists. When, in step 161, a determination is made that the certainty level of the detection result is equal to or more (higher) than the first predetermined value, the process proceeds to step 162. The certainty level of the detection result in this case is from the second level (medium level) to the third level (high level). In step 163, the control device 10 and/or the operation terminal 5 presents the detection result of an obstacle to the operator M. In step 164, the control device 10 and/or the operation terminal 5 requests the operator M to confirm the obstacle. When the existence of an obstacle is denied in step 165, the process proceeds to step 166, in which the parking route and the control instruction are calculated on the assumption that no obstacle exists. After completion, the process proceeds to step 113 of FIG. 5. When the existence of the obstacle is affirmed, it is confirmed that the parking route can be calculated (step 167), and the parking route and the control instruction are calculated on the assumption that the obstacle exists (step 168). When a parking route cannot be calculated, the vehicle is stopped or the parking process in a rescue mode is executed (step 169).

In step 113, the control device 10 monitors the change in the detection result of an obstacle until the vehicle V reaches the position of turn for parking. When the vehicle reaches the position of turn for parking, the gear shift included in the control instruction is executed in step 114. Step 114 is followed by step 115, in which the parking control is completed by sequentially executing control instructions.

The parking control apparatus 100 according to one or more embodiments of the present invention operates to control the operation of the drive system 40 via the vehicle controller 70 in accordance with the control instruction so that the vehicle V1 moves along the parking route. The parking control apparatus 100 operates to calculate command signals to the drive system 40 of the vehicle V1, such as an EPS motor, while feeding back the output value of the steering angle sensor 50 of the steering apparatus so that the travel trajectory of the vehicle V1 coincides with the calculated parking route, and transmit the command signals to the drive system 40 or to the vehicle controller 70 which controls the drive system 40.

The parking control apparatus 100 according to one or more embodiments of the present invention includes a parking control unit. The parking control unit acquires shift range information from an AT/CVT control unit, wheel speed information from an ABS control unit, steering angle information from a steering angle control unit, engine speed information from an ECM, and other necessary information. On the basis thereof, the parking control unit calculates and outputs instruction information on the autonomous steering to the EPS control unit, instruction information such as warning to a meter control unit, etc. The control device 10 acquires information items, which are acquired by the steering angle sensor 50 of the steering apparatus of the vehicle V1 and the vehicle speed sensor 60 and other sensors of the vehicle, via the vehicle controller 70.

The drive system 40 according to one or more embodiments of the present invention drives the vehicle V1 to move (travel) from the current position to the target parking space by driving based on the control command signals acquired from the parking control apparatus 100. The steering apparatus according to one or more embodiments of the present invention is a drive mechanism that moves the vehicle V in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V1 to the target parking space. The control content and operation scheme for parking of the vehicle V1 are not particularly limited, and any scheme known at the time of filing this application can be appropriately applied.

When the parking control apparatus 100 according to one or more embodiments of the present invention operates to control the vehicle V1 to move to the target parking space along the parking route calculated on the basis of the position of the vehicle V1 and the position of the target parking space, the accelerator and the brake are controlled in an autonomous manner on the basis of the designated control vehicle speed (set vehicle speed), and the operation of the steering apparatus controls the movement of the vehicle in an autonomous manner in accordance with the vehicle speed.

The parking control method according to one or more embodiments of the present invention is used in the parking control apparatus as the above and therefore has the following effects. The parking control apparatus 100 according to one or more embodiments of the present invention is configured and operates as the above and therefore has the following effects.

(1) In the parking control method according to one or more embodiments of the present invention, when the first input is made, that is, when the existence of an obstacle is affirmed (or admitted/acknowledged/accepted/recognized/ noted/confirmed), the control device 10 calculates the first parking route on the assumption that the obstacle exists, and calculates a control instruction for moving the vehicle V along the first parking route. Thus, the vehicle V can be moved along the parking route while avoiding the obstacle on the basis of the result of confirmation inputted/made by the operator M, and the parking control can therefore be executed regardless of the accuracy of the detection result of an obstacle.

(2) In the parking control method according to one or more embodiments of the present invention, when the second input is made, that is, when the existence of an obstacle is denied (disavowed/negated), the control device 10 calculates the second parking route on the assumption that no obstacle exists, and calculates a control instruction for moving the vehicle V along the second parking route. Thus, the vehicle V can be moved along the parking route on the assumption that no obstacle exists on the basis of the result of confirmation inputted/made by the operator M, and the parking control can therefore be executed regardless of the accuracy of the detection result of an obstacle.

(3) The parking control method according to one or more embodiments of the present invention includes requesting the first input or the second input when the distance between the operator M and an obstacle is less than a predetermined value. This is because when the obstacle exists at a position far from the operator M, it is considered that the reliability level of determination inputted/made by the operator M is low. Thus, the first input or the second input is requested when the distance between the operator M and an obstacle is less than the predetermined value, and appropriate determination can be obtained from the operator M.

(4) In the parking control method according to one or more embodiments of the present invention, the control device 10 and/or the operation terminal 5 operates the vehicle V to stop when the distance between the operator M and an obstacle is not less than a predetermined value. When the obstacle is located a location away from the operator M by a predetermined distance or more, it is considered that the reliability level of determination inputted/made by the operator M is low; therefore, the vehicle V is stopped and the parking control is canceled. It is thus possible to reduce the execution of the parking control based on an erroneous determination inputted/made by the operator M.

(5) The parking control method according to one or more embodiments of the present invention includes requesting the first input or the second input when the position of an obstacle belongs to the visual recognition area VA for the operator M. The visual recognition area VA for the operator M is calculated using the above-described scheme. When the obstacle OB1 exists within the first area VA in which the obstacle OB1 is visually recognizable by the operator M, it is considered that the reliability level of determination inputted/made by the operator M is high. The first input or the second input is requested when the operator M can visually recognize an obstacle, and it is therefore possible to reduce the execution of the parking control based on an erroneous determination.

(6) The parking control method according to one or more embodiments of the present invention includes operating the vehicle V to stop when the position of an obstacle belongs to the blind area BA other than the visual recognition area VA for the operator M. When an obstacle exists within an area in which the obstacle is visually unrecognizable from the operator M, it is considered that the reliability level of determination inputted/made by the operator M is low; therefore, the vehicle V is stopped and the parking control is canceled. It is thus possible to reduce the execution of the parking control based on an erroneous determination inputted/made by the operator M.

(7) In the parking control method according to one or more embodiments of the present invention, for the detection result with a medium certainty level, the determination inputted/made by the operator M is confirmed because it is unclear whether the detection result is correct or incorrect. When the certainty level is within a predetermined threshold range, it is difficult to evaluate the reliability level of the detection result. In one or more embodiments of the present invention, when the certainty level is within the predetermined threshold range, the operator M is requested to provide the first input or the second input, and the detection result is evaluated again. This allows the parking route and the control instruction to be calculated on the basis of the detection result with a high certainty level.

(8) In the parking control method according to one or more embodiments of the present invention, the display 53 of the operation terminal 5 displays the existence of an obstacle. The operator M can be reliably notified of the existence of an obstacle.

(9) In the parking control method according to one or more embodiments of the present invention, by using the annunciation device 80 to notify the operator M of the existence of an obstacle, the determination result inputted/made by the operator M can be readily acquired.

(10) In the parking control method according to one or more embodiments of the present invention, the operation terminal 5 can be used to present an obstacle, make the operator M determine the existence of the obstacle, and obtain the determination result. The operator M can easily indicate the determination result.

(11) Also in the parking control apparatus 100 in which the method according to one or more embodiments of the present invention is executed, the actions and effects as described in the above (1) to (10) can be obtained.

Part or all of each process of the parking control process according to one or more embodiments of the present invention may be executed in the parking control apparatus 100, or the parking control apparatus 100 may transmit the parking control instruction to the operation terminal 5 so that the operation terminal 5 side executes it. Part or all of each process of the parking control process according to one or more embodiments of the present invention may be executed in the operation terminal 5, or the operation terminal 5 may transmit the parking control instruction to the parking control apparatus 100 so that the parking control apparatus 100 side executes it.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device
11 CPU
12 ROM
13 RAM
132 Storage device
133 Map information
134 Parking lot information 135 Obstacle information
20 Input device
21 Communication device
211 Antenna
30 Output device
31 Display
1a-1d Cameras
2 Ranging devices
3 Information server
31 Communication device
32 Storage device
33 Map information
34 Parking lot information
35 Obstacle information
5 Operation terminal
51 Communication device
511 Antenna
52 Input device
53 Display
200 Onboard device
40 Drive system
50 Steering angle sensor
60 Vehicle speed sensor
70 Vehicle controller
80 Annunciation device
V Vehicle
VA First area, Visual recognition area
BA Second area, Blind area

The invention claimed is:

1. A parking control method for parking a vehicle on a basis of an operation command, comprising:
    acquiring the operation command from an operator located outside the vehicle;
    detecting an obstacle existing around the vehicle;
    when detecting the obstacle, notifying the operator of existence of the obstacle and requesting a first input for affirming the existence of the obstacle or a second input for denying the existence of the obstacle; and
    when obtaining the first input, calculating a first parking route under a condition that the obstacle exists and parking the vehicle in accordance with a control instruction for moving along the first parking route.

2. The parking control method according to claim 1, comprising,
    when obtaining the second input, calculating a second parking route under a condition that the obstacle does not exist and parking the vehicle in accordance with a control instruction for moving along the second parking route.

3. The parking control method according to claim 1, comprising,
    requesting the first input or the second input when a distance between the operator and the obstacle is less than a predetermined value.

4. The parking control method according to claim 1, comprising,
    stopping the vehicle when a distance between the operator and the obstacle is not less than a predetermined value.

5. The parking control method according to claim 1, comprising,
    requesting the first input or the second input when a position of the obstacle belongs to a visual recognition area for the operator.

6. The parking control method according to claim 1, comprising,
    stopping the vehicle when a position of the obstacle does not belong to a visual recognition area for the operator.

7. The parking control method according to claim 1, comprising:
    obtaining a value of a certainty level regarding accuracy of a detection result of the obstacle; and
    when the value of the certainty level is higher than a first predetermined value and lower than a second predetermined value higher than the first predetermined value, performing notification of the obstacle and requesting the first input or the second input.

8. The parking control method according to claim 1, wherein
    an operation terminal receiving an operation input from the operator comprises a communication device and a display, and
    the existence of the obstacle is displayed on the display.

9. The parking control method according to claim 1, wherein
    an annunciation device presenting information to outside of the vehicle is provided, and
    the annunciation device presents the existence of the obstacle.

10. The parking control method according to claim 1, wherein
    an operation terminal receiving an operation input from the operator comprises a communication device and an input device, and
    the input device receives the first input or the second input.

11. A parking control apparatus comprising a control device configured to execute a control instruction for parking a vehicle in accordance with an operation command, the control device operating to:
    acquire the operation command from an operator located outside the vehicle;
    detect an obstacle existing around the vehicle;
    when detecting the obstacle, notify the operator of existence of the obstacle and request a first input for affirming the existence of the obstacle or a second input for denying the existence of the obstacle; and
    when obtaining the first input, calculate a first parking route under a condition that the obstacle exists and park the vehicle in accordance with the control instruction for moving along the first parking route.

* * * * *